Jan. 15, 1952     H. KOTT     2,582,835
PHOTOMETRIC DEVICE
Filed Sept. 3, 1947
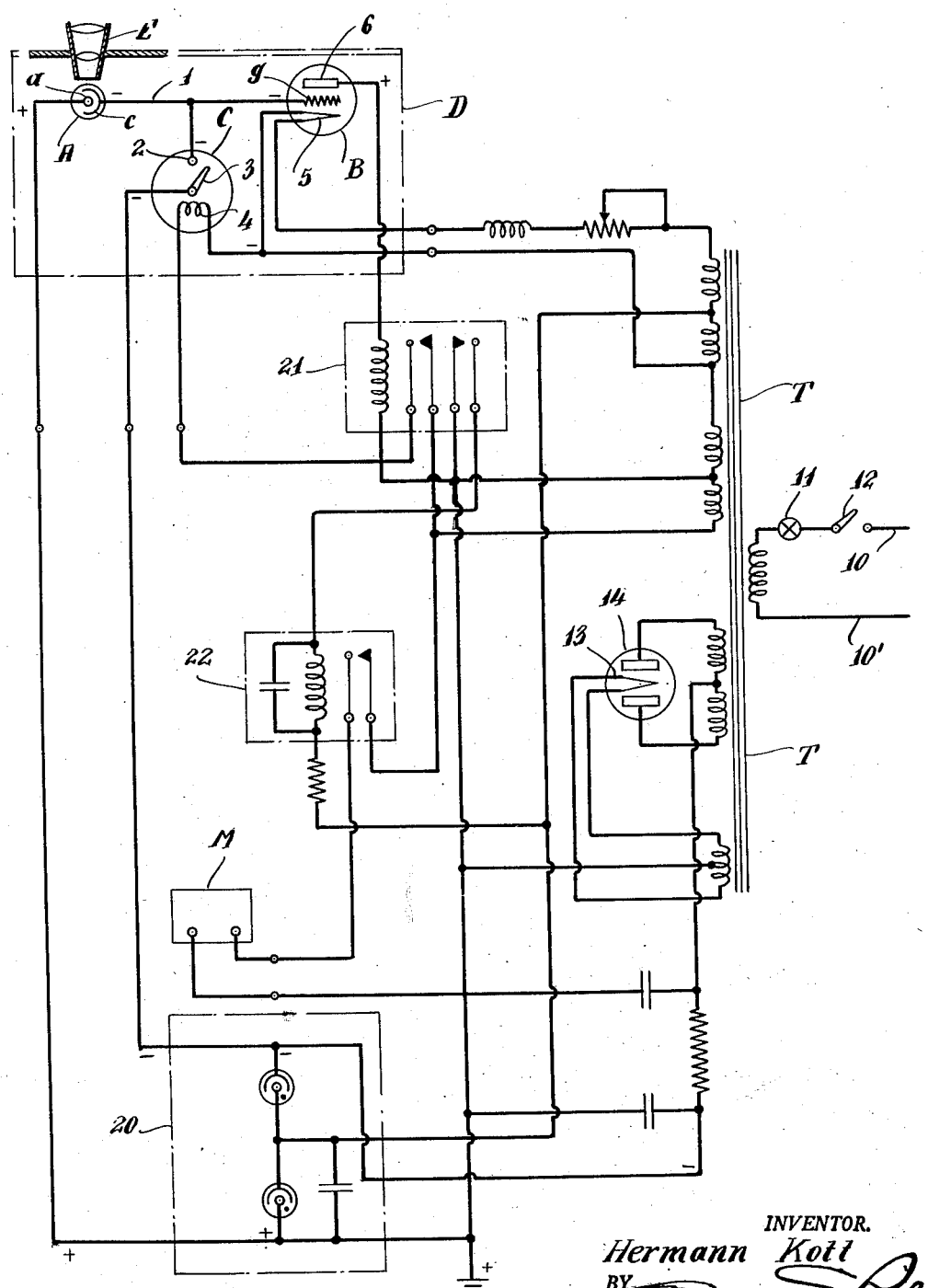
INVENTOR.
Hermann Kott
BY
ATTORNEY.

Patented Jan. 15, 1952

2,582,835

UNITED STATES PATENT OFFICE 2,582,835

PHOTOMETRIC DEVICE

Hermann Kott, West Orange, N. J.

Application September 3, 1947, Serial No. 771,973

5 Claims. (Cl. 88—23)

This invention relates to photo-metric devices and has for its object the provision of such a device which accurately measures the total quantity of light radiation falling upon and illuminating an area or object over an extended time period and indicates periodically the measurement of determined quantities of such measured radiation.

Another object is to provide such a device which is utilizable in the photographic art as an exposure meter to control and regulate the density of the reduced silver salts in a film emulsion by exposure of the film to a measured quantity of radiation.

A further object is to provide an exposure meter photo-metric device which measures light radiation in terms of quantity over an extended time interval and indicates periodically the measurement of a determined quantity of such radiation during said extended time interval.

Other objects will be apparent as the invention is more fully hereinafter disclosed.

In accordance with these objects, I have devised a photo-metric device which measures the total quantity of light radiation falling upon and illuminating an area or object over an extended time interval and which indicates periodically during said time interval the measurement of a determined quantity of said radiation.

In the photographic art it is highly desirable and of extreme importance that the density of the reduced metal salts in the film emulsion be of a determined density to facilitate the reproduction of the picture of the film negative. The density of the said reduced metal salts in the film emulsion is dependent upon the time of exposure of the film emulsion to light radiation of any given intensity. Normally the intensity of light radiation varies materially in any given time interval for one reason or other which is generally beyond the control of the photographer. However, regardless of the intensity of such light radiation the density of such reduced metal salts also depends primarily upon the quantity of such light radiation and variations in such quantity in a determined time interval varies the density of the reduced metal salts materially. It is therefore apparent that to obtain any desired density in such reduced metal salts under conditions of varying light radiation intensity a measurement of the quantity of such radiation over an extended time interval with periodic indications of the measurement of a determined quantity of such radiation enables the photographer to limit the time of exposure of the film to such radiation to determined multiples of the determined quantity of such radiation to obtain such determined density.

The present invention is based upon the time interval required in a photo-electric cell, having a light sensitive cathode and an anode in determined spaced relation enclosed within an evacuated envelope for a sufficient quantity of positive electrons to pass from the anode to the cathode, by the action of light radiation irradiating the photo-cell, to neutralize a determined charge of negative electrons on the cathode which is equal in voltage to a positive voltage impressed on the anode.

By applying this same negative charge upon the grid element of a thermionic device of the three electrode type, known in the art as an electro-meter tube, the negative charge may simultaneously be utilized to prevent the flow of plate current in the said tube between the cathode and plate elements thereof until the negative charge has been neutralized by the positive electron flow in the photo-cell.

The flow of plate current in the said electro-meter tube, upon neutralization of the said negative charge on the grid element thereof, then may be amplified sufficiently to actuate substantially instantaneously a relay switch device immediately recharging the said grid electrode of the electro-meter tube and the said cathode electrode of the photo-cell with a negative charge having a voltage approximating that on the anode electrode of the photo-cell, thus interrupting the flow of plate current in the electro-meter tube and preventing the flow of such plate current for another time interval until the flow of positive electrons in the photo-cell has again neutralized the negative charge on the photo-cell cathode.

As the flow of positive electrons in the photo-cell is directly proportional to the quantity of light radiation falling on the photo-cell over an extended time interval, variations in the intensity of such radiation merely shortens or prolongs the time interval required for the neutralization of a negative charge of any given voltage on the photo-cell cathode which is equal but opposite to the positive voltage on the photo-cell anode.

Accordingly, by providing means actuated by the flow of the plate current in the said electro-meter tube simultaneously with actuation of the relay switch means, adapted to indicate each occurrence of negative charge neutralization, the total quantity of light radiation illuminating any given area or object may be determined by the total number of such negative charge neutralizations, the radiation quantum of each neutralization being a function of the negative charge voltage employed.

In the adaptation of this invention as a photometric device of the exposure meter type for use in the photographic art to control or regulate the time of exposure of a film negative to light radiation thereby to obtain a desired density in the reduced metal salts in the emulsion on the film and a desired definition in the positive images reproduced therefrom, the precise quantum of light radiation per negative charge neutralization normally is immaterial inasmuch as the time of film exposure to the radiation usually includes or covers a plurality of such neutralization time intervals. It is important, however, to so measure the radiation that the time of exposure is limited to the number of negative charge neutralizations rather than to seconds of exposure, where variations in light intensity exist, as is normally the case.

In this adaptation of the present invention the photo-cell electro-meter tube and relay switch combination, hereinabove disclosed, together with the electrical circuit and apparatus elements connecting the elements together in an operating unit are normally enclosed within a radiation impermeable housing having an opening therethrough in a position adapted to direct the radiation, which it is desired to measure, onto the photo-cell and a closure member therefor to interrupt the illumination of the photo-cell to inactivate the apparatus. The indicator device may be associated with these elements within the housing or on the outside of the housing as a separate attachable unit, as may be desired without essential departure from the invention.

As one specific embodiment of the invention, but not as a limitation of the same, I will describe and illustrate the arrangement I have found to be most suitable for use in a photometric device of the exposure meter type.

The following description should be read in association with the accompanying drawings wherein the several apparatus elements and electrical circuit connecting the said elements are shown diagrammatically.

The exposure meter of the present invention includes a photo-electric cell A, and electro-meter tube B and a relay switch C, said cell, tube and switch being enclosed within a radiation impermeable housing D, indicated in dotted box lines. Housing D is provided with an opening E therein through which the radiation to be measured is directed to the photo-cell A. Each of the elements A, B, C, D and E, are old and well known in the art and, per se, form no part of the present invention except in the particular combination thereof and when electrically connected and energized as hereinafter will be described.

As indicated in the drawing, the cathode c of the photo-cell A and the grid element g of the electro-meter tube B are electrically connected together by conductor 1 which conductor 1 also is electrically connected to one of the contacts 2 or 3 of the relay switch C. The other of the contacts 2 or 3 is connected to a source of negative potential of determined voltage and the anode a of the photo-cell A is connected to a source of positive potential of substantially the same voltage.

The electro-magnetic coil 4 of the relay switch C is electrically connected through a suitable amplifier circuit in series with the cathode and plate elements 5 and 6 of the electro-meter tube B, in such manner as to be energized substantially instantaneously with the flow of plate current in the tube B thereby to actuate the movable contact of contacts 2 or 3 of switch C into closure position with resultant flow of a negative charge to cathode c and to grid g having a potential equal to that on the anode electrode a of the cell A thereby interrupting the flow of plate current in tube B and the flow of current between anode and cathode in photo-cell A and de-energizing the coil 4 thus separating contacts 2 and 3. The flow of plate current in tube B stays interrupted until the negative charge on cathode c and grid g has again been neutralized by irradiation of the cathode c.

Many different circuit arrangements are possible to accomplish the above described desired result. The circuit arrangement shown is one designed for operation from a single source of alternating current of the usual 110 volt, 60 cycle type common throughout most power distribution systems. It comprises a transformer T the primary of which is energized by 110 volt 60 cycle alternating current from power supply lines 10—10' in series with which are electrically connected safety fuse 11 and switch means 12 for energizing and de-energizing the transformer T.

Transformer T is provided with a plurality of secondary windings from which current is drawn to energize separately; the cathode 5 of electro-meter tube B; to provide a positive plate voltage of desired constant value onto the plate 6 of the said tube B; to energize cathode 13 of rectifier tube 14; and to provide a voltage output from the rectified tube 14 of the proper value to energize coil 4 of relay switch C and to provide direct current potentials, positive and negative, of equal value to apply to anode a and to cathode c and grid g, respectively, in accordance with the above disclosure; also to provide current for energizing an indicating device, such as a timer mechanism M.

It is believed that one skilled in the art will readily recognize and be able to read the circuit diagram of the drawing without the necessity of detailed written description of the same. The essential departure from prior art practice therein being that in the circuit the positive side thereof is grounded instead of the negative side. It is by thus grounding the positive side, rather than the negative side of the circuit, that I am able to impress on the cathode and grid electrodes of the photo-cell A and electro-meter tube B, respectively, the negative charge required for operation of the photo-metric device, the normal internal resistance of these devices preventing this negative charge from passing through the devices to the anode and plate elements, respectively, for discharge to ground, until the internal resistance of the photo-cell A, by cathode irradiation, is lowered sufficiently to permit negative charge neutralization, as hereinabove described.

The essential element in the circuit is a source of direct current at a substantially constant voltage for application across the anode and cathode of photo-cell A. This is obtained through a voltage regulator means of common type enclosed within dotted box lines 20. Relay switches enclosed within dotted box lines 21 and 22 are standard type switches, the operation of which is well known in the art. Relay switch 21 is energized for actuation by the flow of plate current in the electro-meter tube B to actuate relay switch C and relay switch 22 controlling the passage of current into timer mechanism M. De-energization of relay switch 21, upon the closing of contacts 2—3 in relay switch C, de-energizes relay switches C and 22.

In the operation of this device I have found that a positive voltage of 150 volts on anode $a$, a negative charge of 150 volts on cathode $c$ and on grid $g$, with a plate current voltage of about 20 volts on plate 6 of the electro-meter tube B, gives exceedingly satisfactory operating results. The current flowing to timer mechanism M may be amplified to any value required to actuate the mechanism.

In place of a timer mechanism M, I may employ any other type or kind of indicator means which may be electrically operated and which functions to visually or audibly indicate each occurrence of negative charge neutralization on cathode $c$ and grid $g$ with resultant flow of plate current in electro-meter tube B. All of these said indicating means are old and well known in the art and, per se, form no part of the present invention except in combination with the other means and elements thereof.

In the commercial utilization of the device of the present invention, as an exposure meter device, the photo-cell A is exposed to the light radiation to which the photographic plate or film is to be exposed and the time of exposure of the photographic plate or film to the radiation is limited to a determined number of negative charge neutralizations which by previous calibration has been found to provide in the film or plate emulsion the desired density in the reduced metal salts produced by such film exposure. Calibration of the photo-metric device to determine the precise amount or quantity of light radiation required to effect the neutralization of any determined negative charge on the cathode $c$ and grid $g$ under controlled test conditions is neither difficult nor beyond the expected skill of one skilled in the art and does not require extended disclosure. The desired density in said reduced metal salts may vary widely in value without essential departure from the invention.

It is believed apparent that the present invention may be widely varied without essential departure therefrom or from the specific embodiment thereof hereinabove given, and all such modifications and departures from the same are contemplated as may fall within the scope of the following claims.

What I claim is:

1. A photo-metric device comprising in combination a photo-electric cell having an anode and a light sensitive cathode enclosed within a radiation permeable envelope, a 3-electrode thermionic device having a thermionically active cathode, a plate electrode and a grid electrode, and a relay switch having a stationary contact, a movable contact and an electro-magnetic coil arranged to move the movable contact into and out of closure position with the stationary contact upon energization and de-energization of the coil, respectively, means electrically connecting the light sensitive cathode of the cell, the grid electrode of the thermionic device and one of the contacts of said relay switch together, means applying to the anode of the said cell and to the other of said contacts of the said relay switch a direct current of determined voltage with the positive potential on the said anode and connected to ground potential and the negative potential connected to the said other contact; means establishing a plate current flow of determined voltage in said 3-electrode device, means actuated by said plate current to energize said relay coil to actuate said movable contact into closure position with the stationary contact, thereby to impress a negative charge on the light sensitive cathode and grid electrode electrically connected therewith to thereby terminate the flow of plate current in said 3-electrode device, means actuated by said plate current flow to indicate the occurrence thereof, and means limiting the irradiation of said photo-electric cell to radiation the quantity of which is to be measured.

2. A photo-metric device comprising in combination a photo-electric cell, a thermionic device of the 3-electrode type, a relay switch, and an electrical circuit including said cell, thermionic device and relay switch, said circuit including means supplying a direct current of determined voltage, the positive side of which is connected to the anode electrode of the said cell and to ground and the negative side of which is connected to one side of the said switch with the opposite side of the switch being electrically connected to the cathode of said cell and to the grid electrode of said thermionic device, means providing for the flow of a plate current through said thermionic device at a determined voltage, means actuated by said plate current to energize the electro-magnetic coil of said relay switch to close the contacts therein, thereby to apply the negative potential on one side of the switch to interrupt the flow of said plate current and to charge the cell cathode negatively to the same potential on the cell anode, means simultaneously actuated by said plate current flow to actuate means indicating the occurrence of said plate current flow and interruption, and means limiting the irradiation of the said cell to radiation the quantity of which is to be measured.

3. In a photo-metric device, of the exposure meter type, the combination of a photo-electric cell, a three-electrode electro-meter tube and a relay switch, the cathode and grid electrodes of the cell and tube, respectively, being electrically connected together and to one of the movable and stationary contacts of said relay switch with the other contact of said relay switch being electrically connected to the negative side of a source of direct current of determined voltage, the positive side of which is electrically connected to the anode of the said cell and to ground, a radiation impermeable housing enclosing the said photo-cell having an opening therein and means directing radiation to be measured therethrough onto the said photo-cell, an electrical circuit energizing the cathode electrode of said electro-meter tube, an electrical circuit providing a desired positive voltage on the plate electrode of said electro-meter tube and an electrical circuit including the actuating electro-magnetic coil of said relay switch energized by the flow of plate current in said electro-meter tube to actuate the movable contact into closure position with the stationary contact thereby to close the circuit and to apply the negative voltage on the one contact through the other contact onto the cathode and grid elements of the said photo-cell and electro-meter tube and to open said contacts, and means also actuated by the flow of said plate current in the said electro-meter tube to actuate means indicating each occurrence of said plate current flow and interruption.

4. In a photo-metric device of the exposure meter type, the combination of a photoelectric cell of the two-electrode type having an anode and a radiation sensitive cathode disposed in spaced relation within an enclosing radiation permeable envelope, a three-electrode electro-meter tube having grid, plate and cathode electrodes, and a relay switch having a stationary contact, a movable contact and an electro-magnetic coil to actuate the movable contact into and out of closure position with the stationary contact upon energization and de-energization, respectively, of the said coil, an electrical circuit means having its positive side grounded to apply to the anode of the said photo-electric cell and to the movable contact of said relay switch, respectively, a positive and negative direct current voltage of equal and substantially constant value, an electrical circuit connecting together the cathode electrode of the said photo-electric cell, the grid electrode of the said electro-meter tube and the stationary contact of said relay switch, an electrical circuit including the plate electrode of said electro-meter tube and the energizing coil of said relay switch to direct the plate current of the said tube through the coil to energize the coil to move the movable electrode into closure position with the stationary contact of the switch, means actuated by said plate current to energize an indicating means indicating the occurrence of plate current flow in the said electro-meter tube, and means to irradiate the photo-cell with light radiation the quantity thereof which is to be measured to initiate the flow of electrons in the said cell for neutralization of any negative charge on the cathode electrode of said cell, thereby to initiate plate current flow in said electro-meter tube.

5. In a photo-metric device for measuring the quantity of radiation irradiating an object or area, the combination of a photo-electric cell, an electro-meter tube and a relay switch, the anode of said cell being charged positively and grounded, the cathode and grid electrodes of said cell and tube, respectively, being electrically connected together and to one of the contacts of the said relay switch, the opposite contact of said relay switch being charged negatively to the same potential applied positively to the anode of the said cell, means limiting the irradiation of the said cell to radiation the quantity of which over an extended time interval is to be measured, an electrical circuit including the plate electrode of the said electro-meter tube and a current amplifier carrying the plate current flow of the said tube, an electrical circuit including the energizing coil of the said relay switch for carrying said amplified current; and an electrical circuit including an indicating device and means energized by said plate current flow to energize said circuit.

HERMANN KOTT.

REFERENCES CITED

The following references are of record in the file of this patent:

UNITED STATES PATENTS

| Number | Name | Date |
| --- | --- | --- |
| 1,818,003 | Myers | Aug. 11, 1931 |
| 1,963,342 | Whitson et al. | June 19, 1934 |
| 1,973,468 | Dennis | Sept. 11, 1934 |
| 2,078,768 | Meior | Apr. 27, 1937 |
| 2,090,825 | Anthony et al. | Aug. 24, 1937 |
| 2,309,048 | Curry | Jan. 19, 1943 |
| 2,386,320 | Kott | Oct. 9, 1945 |
| 2,434,101 | Cann | Jan. 6, 1948 |